US009617940B2

United States Patent
Klingbeil et al.

(10) Patent No.: US 9,617,940 B2
(45) Date of Patent: Apr. 11, 2017

(54) ENGINE DIAGNOSTIC SYSTEM AND AN ASSOCIATED METHOD THEREOF

(71) Applicant: General Electric Company, Schenectady, NY (US)

(72) Inventors: Adam Edgar Klingbeil, Ballston Lake, NY (US); Eric Richard Dillen, Edinboro, PA (US)

(73) Assignee: General Electric Company, Niskayuna, NY (US)

(*) Notice: Subject to any disclaimer, the term of this patent is extended or adjusted under 35 U.S.C. 154(b) by 109 days.

(21) Appl. No.: 14/459,438

(22) Filed: Aug. 14, 2014

(65) Prior Publication Data

US 2016/0047329 A1 Feb. 18, 2016

(51) Int. Cl.
| | | |
|---|---|---|
| *F02D 41/22* | (2006.01) | |
| *F02D 41/30* | (2006.01) | |
| *F02D 19/06* | (2006.01) | |
| *F02D 41/00* | (2006.01) | |
| *F02D 41/14* | (2006.01) | |
| *F02D 35/02* | (2006.01) | |

(52) U.S. Cl.
CPC ......... *F02D 41/221* (2013.01); *F02D 19/061* (2013.01); *F02D 19/0623* (2013.01); *F02D 19/0692* (2013.01); *F02D 41/0025* (2013.01); *F02D 41/222* (2013.01); *F02D 41/3005* (2013.01); *F02D 35/027* (2013.01); *F02D 41/1446* (2013.01)

(58) Field of Classification Search
CPC .................................. F02D 41/26; F02D 41/30
USPC ............... 73/114.25, 114.22, 114.02, 114.06, 73/114.07, 114.45, 114.48, 114.71
See application file for complete search history.

(56) References Cited

U.S. PATENT DOCUMENTS

| | | | |
|---|---|---|---|
| 4,981,124 A | | 1/1991 | Sellner et al. |
| 5,031,594 A | * | 7/1991 | Morikawa ............... F02D 41/08 123/295 |
| 5,640,847 A | * | 6/1997 | Nakajima ............. F01N 11/007 60/276 |

(Continued)

FOREIGN PATENT DOCUMENTS

| | | |
|---|---|---|
| JP | 2012219743 A | 11/2012 |
| WO | 2013117942 A2 | 8/2013 |

OTHER PUBLICATIONS

Paul S. Min, "Diagnosis of On-Board Sensors in Internal Combustion (IC) Engines", American Control Conference, 1989, IEEE, Jun. 21-23, 1989, pp. 1065-1070, Pittsburgh, PA, USA.

(Continued)

*Primary Examiner* — Joseph Dallo
(74) *Attorney, Agent, or Firm* — Joseph J. Christian

(57) ABSTRACT

A method involves controlling a fuel injector to inject a first quantity of a fuel into a cylinder from a plurality of cylinders, of an engine and detecting a first value of a parameter associated with the engine. The method further involves controlling the fuel injector to inject a second quantity of the fuel different from the first quantity of the fuel, into the cylinder of the engine and detecting a second value of the parameter associated with the engine. The method also involves comparing the first value with the second value and detecting a hardware anomaly associated with the engine based on the comparison of the first value with the second value.

30 Claims, 6 Drawing Sheets

(56) References Cited

U.S. PATENT DOCUMENTS

| | | | | |
|---|---|---|---|---|
| 5,743,085 | A * | 4/1998 | Takaku | F01N 3/22 123/688 |
| 5,964,208 | A * | 10/1999 | Yamashita | F02D 41/1456 123/674 |
| 6,557,530 | B1 * | 5/2003 | Benson | F02D 41/22 123/447 |
| 7,019,626 | B1 | 3/2006 | Funk | |
| 7,523,653 | B2 | 4/2009 | Smith et al. | |
| 7,562,558 | B2 | 7/2009 | Horner et al. | |
| 7,571,640 | B2 | 8/2009 | Andrews | |
| 7,769,536 | B2 | 8/2010 | Hamama et al. | |
| 7,931,008 | B2 * | 4/2011 | Verner | F02D 41/20 123/479 |
| 8,118,006 | B2 * | 2/2012 | Pursifull | F02D 41/0027 123/299 |
| 2002/0148441 | A1 * | 10/2002 | Tuken | F02D 41/0085 123/436 |
| 2004/0118384 | A1 * | 6/2004 | Oyama | F02D 41/20 123/479 |
| 2005/0061067 | A1 * | 3/2005 | Maki | F02D 41/1454 73/114.74 |
| 2005/0098156 | A1 * | 5/2005 | Ohtani | F02D 41/3094 123/431 |
| 2006/0005821 | A1 * | 1/2006 | Osumi | F02D 41/18 123/674 |
| 2006/0054149 | A1 * | 3/2006 | Uchiyama | F02D 41/222 123/676 |
| 2007/0240403 | A1 * | 10/2007 | Miyasako | F01N 11/007 60/277 |
| 2008/0066447 | A1 * | 3/2008 | Sawada | F01N 3/0842 60/276 |
| 2008/0295489 | A1 * | 12/2008 | Elfvik | F01N 3/2066 60/277 |
| 2009/0107455 | A1 * | 4/2009 | Pallett | F02D 41/0007 123/299 |
| 2009/0158833 | A1 * | 6/2009 | Kusatsugu | F02D 41/0087 73/114.45 |
| 2009/0182490 | A1 * | 7/2009 | Saunders | F02D 41/1454 701/114 |
| 2009/0235645 | A1 * | 9/2009 | Noda | F01N 11/002 60/285 |
| 2010/0147058 | A1 * | 6/2010 | Cinpinski | F02D 41/221 73/114.51 |
| 2010/0211290 | A1 * | 8/2010 | Kidokoro | F02D 41/1408 701/103 |
| 2012/0116651 | A1 * | 5/2012 | Miyamoto | F02D 41/30 701/103 |
| 2012/0245824 | A1 * | 9/2012 | Miura | F02D 41/22 701/104 |
| 2012/0296553 | A1 * | 11/2012 | Bagnasco | F02D 41/008 701/103 |

OTHER PUBLICATIONS

Rizzoni et al., "Onboard detection of internal combustion engine misfires", Electronic Applications in Transportation, 1990., IEEE Workshop on, Oct. 18-19, 1990, pp. 39-49, Dearborn, Michigan.

* cited by examiner

ENGINE DIAGNOSTIC SYSTEM AND AN ASSOCIATED METHOD THEREOF

BACKGROUND

The invention relates generally to engines, and more particularly, to an engine diagnostic system and method for detecting a hardware anomaly.

Typically, in internal combustion engines, air enters through an intake manifold and mixes with a fuel to form an air-and-fuel mixture. The air-and-fuel mixture is combusted within a plurality of cylinders to drive pistons which rotatably turn a crankshaft to produce drive torque. In certain instances, the air-and-fuel mixture in a particular cylinder may combust at an undesired time. More specifically, temperature and/or pressure of the air-and-fuel mixture may exceed a critical level, causing the air-and-fuel mixture to ignite automatically prior to a normal ignition. The automatic ignition of the air-and-fuel mixture at an undesired time may be termed as "pre-ignition." Such a pre-ignition may result in engine knock. For example, engine knock may be a noise/vibration resulting from a rapid increase in cylinder pressure. Engine knock over a sustained period of time may affect other components of the engine.

Engines may use control systems including misfire detection systems and/or knock detection systems that determine if and when an engine knock occurs. Such engine control systems regulate engine operation to reduce or prevent engine knock. Preventing engine knock may enhance engine performance and/or vehicle drivability. However, the use of such conventional control systems has drawbacks associated with false outputs flagged by the knock sensor. Moreover, there are uncertainties in determining as to what component has failed when knock or misfire is detected.

There is a need for an enhanced engine diagnostic system and method.

BRIEF DESCRIPTION

In accordance with one exemplary embodiment, a method is disclosed. The method involves controlling a fuel injector to inject a first quantity of a fuel into a cylinder from a plurality of cylinders, of an engine and detecting a first value of a parameter associated with the engine. The method further involves controlling the fuel injector to inject a second quantity of the fuel different from the first quantity of the fuel, into the cylinder of the engine and detecting a second value of the parameter associated with the engine. The method also involves comparing the first value with the second value and detecting a hardware anomaly associated with the engine based on the comparison of the first value with the second value.

In accordance with another exemplary embodiment, a computer readable medium, having instructions stored thereon which, when executed, causes a processor-based unit for an engine to perform a method is disclosed.

In accordance with another exemplary embodiment, a system is disclosed. The system includes an engine having a plurality of cylinders and a fuel injector coupled to the plurality of cylinders. The system further includes a controller coupled to the fuel injector. The controller is configured to control a fuel injector to inject a first quantity of a fuel into a cylinder from a plurality of cylinders, of an engine and detect a first value of a parameter associated with the engine. The controller is further control the fuel injector to inject a second quantity of the fuel different from the first quantity of the fuel, into the cylinder of the engine and detect a second value of the parameter associated with the engine. The controller is further configured to compare the first value with the second value and detect a hardware anomaly associated with the engine based on the comparison of the first value with the second value.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

In the following specification and the claims, reference will be made to a number of terms, which shall be defined to have the following meanings.

The singular forms "a", "an", and "the" include plural references unless the context clearly dictates otherwise.

As used herein, the term "non-transitory computer-readable media" is intended to be representative of any tangible computer-based device implemented in any method or technology for short-term and long-term storage of information, such as computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the internet, as well as yet to be developed digital means, with the sole exception being a transitory, propagating signal.

As used herein, the terms "software" and "firmware" are interchangeable, and may include any computer program stored in memory for execution by devices that include, without limitation, mobile devices, clusters, personal computers, workstations, clients, and servers.

As used herein, the term "computer" and related terms, e.g., "computing device", are not limited to integrated circuits referred to in the art as a computer, but broadly refers to at least one microcontroller, microcomputer, programmable logic controller (PLC), application specific integrated circuit, and other programmable circuits, and these terms are used interchangeably herein.

Figure 1:
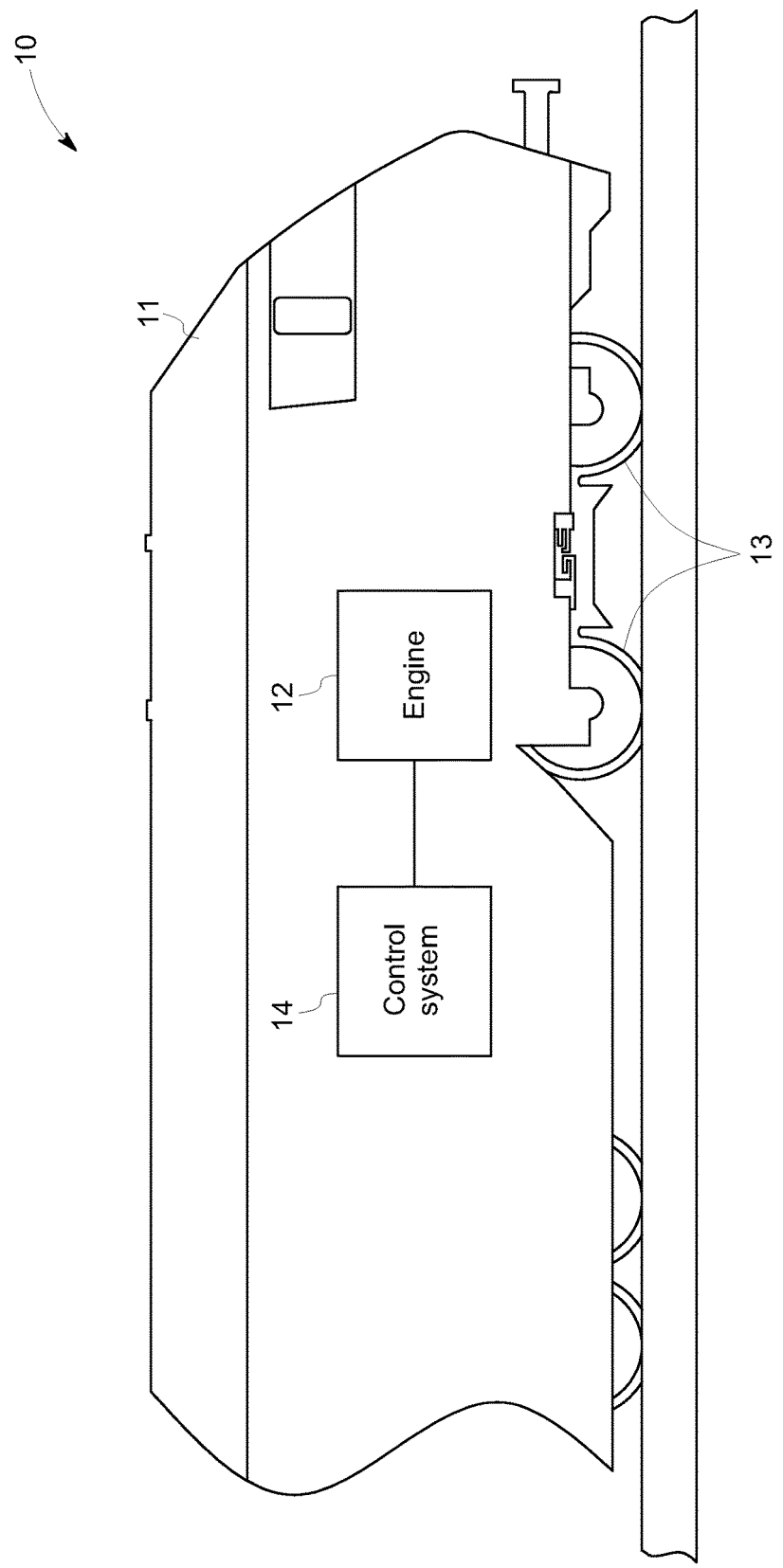
FIG. 1 is a schematic diagrammatical representation of a vehicle moving from a first operating point to a second operating point along a predefined path in accordance with an exemplary embodiment.

Referring to FIG. 1, a schematic diagrammatical representation of a vehicle 10 moving from a first operating point to a second operating point along a predefined path is shown. In the illustrated embodiment, the vehicle 10 is a locomotive. Suitable vehicles include passenger and non-passenger vehicles, hybrid vehicles, off-highway vehicles, on-road vehicles (such as tractor trailers), tracked vehicles, rail vehicles, and the like. The vehicle 10 includes a dual fuel engine 12 and an exemplary control system 14 coupled to the dual fuel engine 12.

In the illustrated embodiment, the vehicle 10 is driven by the engine 12 utilizing a plurality of fuels. In the exemplary engine 12, a reduction in nitrogen oxide (NOx) and particulate matter (PM) emissions is enabled by combusting a relatively larger fraction of the premixed fuel. However, relative costs and availability of different fuels are constantly in flux. For example, in some embodiments, diesel and natural gas may be utilized to drive the engine 12. If the cost of diesel increases relative to the cost of the natural gas, more natural gas may be used resulting in reduced cost and emissions. If the cost of natural gas is increased relative to the cost of the diesel, then more diesel may be used to drive the engine 12. It should be noted herein that in certain embodiments, the vehicle 10 may also utilize other fuels instead of diesel, natural gas.

The exemplary control system 14 is used to determine hardware anomalies in the engine 12. Although a dual fuel engine is discussed herein, the exemplary control system 14 and an associated method may also be applicable to other types of engine, for example a single fuel engine. The onboard diagnostics may be used to differentiate between, for example, a stuck open or closed fuel injector, true knock or a failed knock sensor. The dual fuel engine 12 and the control system 14 are explained in greater detail with reference to subsequent figures.

Figure 2:
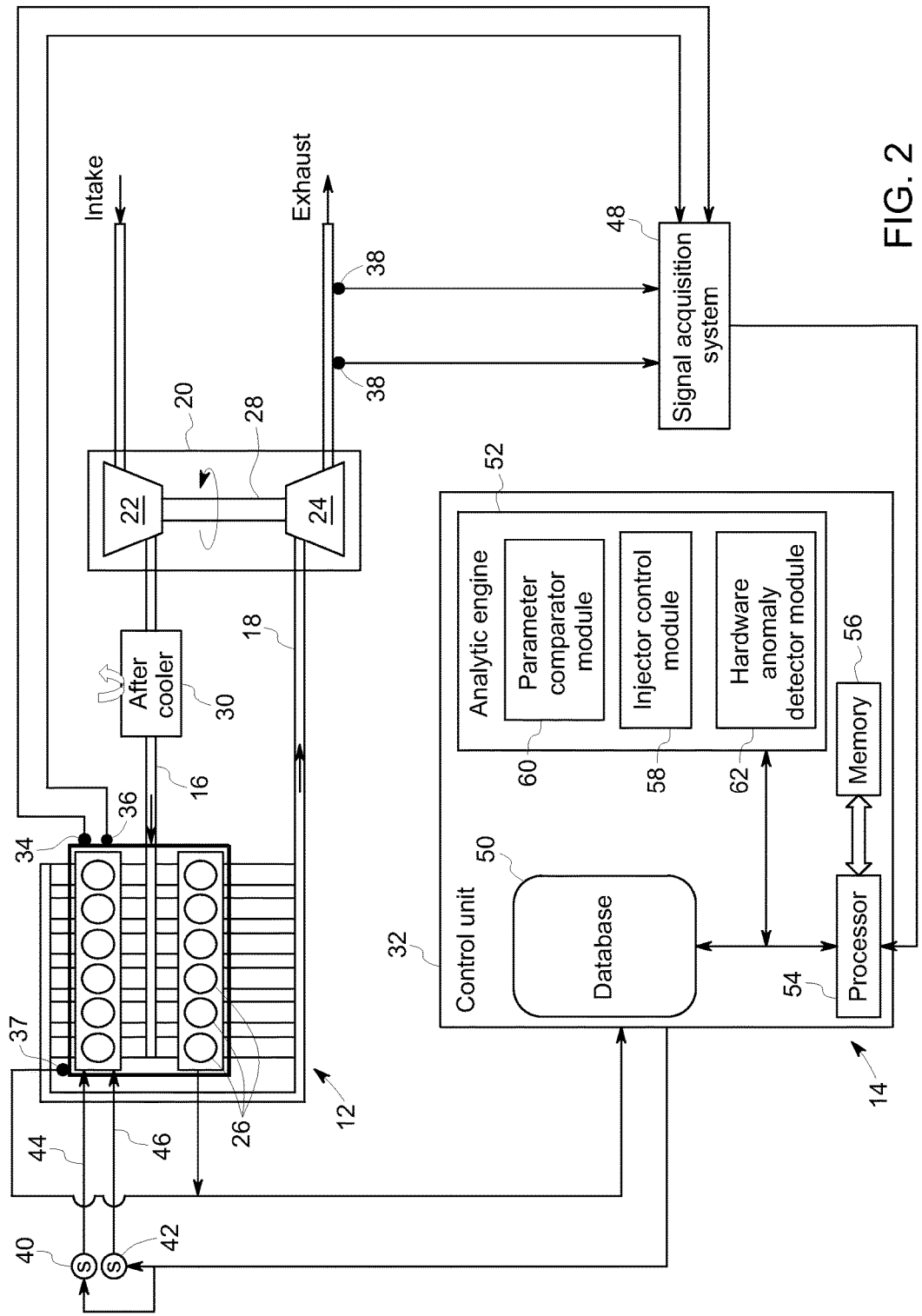
FIG. 2 is a schematic diagrammatical representation of a dual fuel engine having hardware anomaly detection features in accordance with certain embodiments of the present invention.

Referring to FIG. 2, a schematic diagrammatical representation of the dual fuel engine 12 having hardware anomaly detection features is illustrated in accordance with certain embodiments of the present invention. As discussed in further detail below, embodiments of the present invention provide monitoring and control features, such as sensors and control logic to determine a root cause of detected knock or misfire, normal knock or misfire, abnormal knock or misfire detected by a faulty fuel injector, false knock or misfire detected by a faulty sensor.

The illustrated engine 12 includes an air intake manifold 16 and an exhaust manifold 18. The engine 12 is provided with a turbocharger 20 having a compressor 22 and a turbine 24. The compressor 22 is operated to supply compressed air to the intake manifold 16 for combustion within a plurality of cylinders 26. The turbine 24 is coupled to the exhaust manifold 18, such that the exhaust gases expand through the turbine 24, putting work onto and rotating a turbocharger shaft 28 coupled to the compressor 22. The compressor 22 draws ambient air through a filter (not shown) and provides compressed air to a heat exchanger 30. The temperature of air is increased due to compression through the compressor 20. The compressed air flows through the heat exchanger 30 such that the temperature of air is reduced prior to delivery into the intake manifold 16 of the engine 12. In one embodiment, the heat exchanger 30 is an air-to-water heat exchanger, which utilizes a coolant to facilitate removal of heat from the compressed air. In another embodiment, the heat exchanger 30 is an air-to-air heat exchanger, which utilizes ambient air to facilitate removal of heat from the compressed air. In another embodiment, the heat exchanger 30 is a combination of an air-to-air heat exchanger and an air-to-water heat exchanger, which utilizes both ambient air and liquid to facilitate removal of heat from the compressed air.

The control system 14 also includes a control unit 32. In one embodiment, the control unit 32 is an electronic logic controller that is programmable by a user. In the illustrated embodiment, a plurality of parameter sensors including a knock sensor 34, a speed sensor 36, a temperature sensor 38, an injection sensor 37, and an emission sensor 39 are configured to measure engine knock, engine speed, exhaust gas temperature, injection duration, and exhaust emissions respectively. The control unit 32 receives the corresponding output signals from the plurality of sensors 34, 36, 37, 38, 39. In other embodiments, other types of sensors for measuring different parameters associated with the engine 12 may be used.

First and second fuel injectors 40, 42 are used for injecting a first fuel 44 and a second fuel 46 (for example, natural gas and diesel) into the plurality of cylinders 26 of the engine 12. Specifically, the first fuel injector 40 injects the first fuel 44 into the intake manifold 16 of the engine 12. The second fuel injector 42 is used to inject the second fuel 46 into the plurality of cylinders 26 of the engine 12. A piston (not shown) is slidably disposed in each cylinder 26 and reciprocates between a top dead center and a bottom dead center position. The control unit 32 is operable to produce a control signal to control the first and second fuel injectors 40, 42, receive corresponding output signals from the sensors 34, 36, 37, 38, 39 and detect hardware anomaly associated with the engine 12. The anomaly may be referred to as a deviation from a normal operating condition. The anomaly may be a hardware failure associated with the engine. In one embodiment, the control unit 32 is configured to detect anomaly of the exhaust gas temperature sensor 38. In another embodiment, the control unit 32 is configured to detect anomaly of the knock sensor 34. In yet another embodiment, the control unit 32 is configured to detect anomaly of the emission sensor 39. In yet another embodiment, the control unit 32 is configured to detect anomaly of the first and/or second fuel injectors 40, 42. In other embodiments, the control unit 32 is configured to other hardware anomalies associated with the engine 12. The steps involved in detection of hardware anomalies are explained in greater detail with reference to subsequent figures.

A signal acquisition system 48 receives the plurality of signals from the plurality of sensors 34, 36, 37, 38, 39 and transmits the plurality of signals to the control unit 32. The control unit 32 includes a database 50, an analytic engine 52, a processor 54, and a memory 56.

The database 50 may be configured to store predefined information about the engine 12. For example, the database 50 may store information relating to engine knock, exhaust gas temperature, engine speed, injection duration, exhaust emissions, or the like. In other embodiments, the database 50 may store additional information related to intake manifold temperature, exhaust manifold temperature, airflow, altitude/ambient pressure of operation, ambient temperature of operation, fuel injection timing, reference ambient temperature, reference ambient pressure, or the like. Furthermore, the database 50 may be configured to store actual sensed/detected information from the above-mentioned sensors 34, 36, 37, 38, and 39. The algorithm facilitates the processing of signals from the above-mentioned plurality of sensors 34, 36, 37, 38, and 39.

In one embodiment, the database 50 may be stored in a single memory module at one location. In other embodiments, the database 50 may be stored in a plurality of memory modules in a distributed manner. The database 50 may be at least one of a SQL database, an Oracle database, and a MySQL database. In alternate embodiments, other types of databases including relationship database systems (RDBS) may be used to store the plurality of rules. It may be noted herein that in one embodiment, the database 50 is a customized database. In other embodiments, the database 50 may be an off-the-shelf database.

The analytic engine 52 is communicatively coupled to the database 50. The analytic engine 52 may be stored in the memory 56 and executable by the processor 54. In an alternate embodiment, the analytic engine 52 may also be a specialized hardware such as a Field Programmable Gate Array (FPGA). In the illustrated embodiment, the analytic engine 52 includes an injector control module 58, a parameter comparator module 60, and a hardware anomaly detector module 62.

The injector control module 58 includes codes and routines configured to control the fuel injectors 40, 42 for controlling the quantity of fuel injected into the cylinders 26. In one embodiment, the first fuel injector 40 is controlled to vary the quantity of the first fuel 44 and the second fuel injector 42 is controlled to inject a constant quantity of the second fuel 46 into a cylinder 26 from the plurality of cylinders 26. Further, the first fuel injector 40 is controlled to inject a constant quantity of the first fuel 44 and the second fuel injector 42 is controlled to vary the quantity of the second fuel 46 injected into a cylinder 26 from the plurality of cylinders 26. Further, the first fuel injector 40 is disabled and the second fuel injector 42 is controlled to increase the quantity of the second fuel 46 injected into the corresponding cylinder 26 from the plurality of cylinders 26. In one embodiment, injector control module 58 includes a set of instructions executable by the processor 54. In another embodiment, the injector control module 58 is stored in the memory 56 and is accessible and executable by the processor 54. In either embodiment, the injector control module 58 is adapted for communication and cooperation with the processor 54 and other modules of the control unit 32.

The parameter comparator module 60 includes codes and routines configured to compare a first detected value of a parameter associated with the engine with a second detected value of a parameter. In one embodiment, a first detected value of exhaust gas temperature is compared with a second detected value of exhaust gas temperature. In another embodiment, a first detected value of engine speed is compared with a second detected value of engine speed. In yet another embodiment, a first detected value of exhaust emissions is compared with a second detected value of exhaust emissions. In yet another embodiment, a first detected value of injection duration is compared with a second detected value of injection duration.

In one embodiment, the parameter comparator module 60 includes a set of instructions executable by the processor 54 to provide the functionality for handling communications between the plurality of sensors 34, 36, 37, 38, 39 and the other modules of the control unit 32. In another embodiment, the parameter comparator module 60 is stored in the memory 56 and is accessible and executable by the processor 54. In either embodiment, the parameter comparator module 60 is adapted for communication and cooperation with the processor 54 and other modules of the control unit 32.

The hardware anomaly detector module 62 includes codes and routines configured to detect a hardware anomaly associated with the engine 12 if the first value of the detected parameter associated with the engine 12 is approximately equal to the second value of the detected parameter. It should be noted herein that the term "approximately equal" not only means that the first value is equal to the second value, but also includes smaller deviations between the first value and the second value. For example, the first value is approximately equal to the second value if the deviation between the first value and the second value is one unit. In another example, the first value is approximately equal to the second value if the deviation between the first value and the second value is two units. Such a deviation may vary depending on the application. In one embodiment, the hardware anomaly detector module 62 detects an exhaust gas temperature sensor anomaly if the first value of the detected exhaust gas temperature is approximately equal to the second value of the detected exhaust gas temperature. In another embodiment, the hardware anomaly detector module 62 detects a fuel injector anomaly if the first value of the detected engine speed is approximately equal to the second value of the detected engine speed. In yet another embodiment, the hardware anomaly detector module 62 detects an emission sensor anomaly if the first value of the detected emissions is approximately equal to the second value of the detected emissions. In yet another embodiment, the hardware anomaly detector module 62 detects a fuel injector anomaly when injection duration of a remaining number of cylinders is approximately equal to the second value of the injection duration. In another embodiment, the hardware anomaly detector module 62 determines normality of the first fuel injector 40 if a first value of the detected engine parameter is different from the second value of the detected engine parameter. The normality may be referred to as a normal operating condition associated with the device. Further, the hardware anomaly detector module 62 determines normality of the second fuel injector 42 if the first value of detected engine parameter is different from the second value of the detected engine parameter. In such an embodiment, the hardware anomaly detector module 62 detects a knock sensor anomaly if the knock sensor 34 detects engine knock. The engine parameter may be for example, engine speed.

The hardware anomaly detector module 62 is configured to handle communications between the plurality of sensors 34, 36, 37, 38, 39 and the other modules of the control unit 32. In one embodiment, the hardware anomaly detector module 62 includes a set of instructions executable by the processor 54 to provide the functionality for handling communications between the plurality of sensors 34, 36, 37, 38, 39 and the other modules of the control unit 32. In another embodiment, the hardware anomaly detector module 62 is stored in the memory 56 and is accessible and executable by the processor 54. In either embodiment, the hardware anomaly detector module 62 is adapted for communication and cooperation with the processor 54 and other modules of the control unit 32.

The processor 54 is communicatively coupled to the database 50 and the analytic engine 52. The processor 54 may include at least one arithmetic logic unit, microprocessor, general purpose controller or other processor arrays to perform the desired computations. In one embodiment, the processor 54 is a custom hardware configured to perform functions of the analytic engine 52 and the signal acquisition system 48. In another embodiment, the processor 54 is a digital signal processor or a microcontroller. The processor 54 may also be configured to manage the contents of the database 50. In some embodiments, other type of processors, operating systems, and physical configurations are envisioned.

The memory 56 is coupled to the processor 54 and may also be optionally coupled to the other modules of the control unit 32. The memory 56 is configured to store instructions performed by the processor 54 and contents of the database 50. The memory 56 may be a non-transitory storage medium. For example, the memory 56 may be a dynamic random access memory (DRAM) device, a static random access memory (SRAM) device, flash memory, or other memory devices. In one embodiment, the memory 56 may include a non-volatile memory or similar permanent storage device, and media such as a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or other non-volatile storage devices. In one embodiment, the memory 56 may be communicatively coupled to the processor 54. In an alternate embodiment, the memory 56 is an on-board memory of the processor 54.

In an exemplary embodiment, the non-transitory computer readable medium encoded with a program, instructs the processor 54 to perform functions associated with the control unit 32 for detecting hardware anomaly associated with the engine 12. The program instructions include one or more functions of the database 50, the analytic engine 52, and the signal acquisition system 48.

Figure 3:
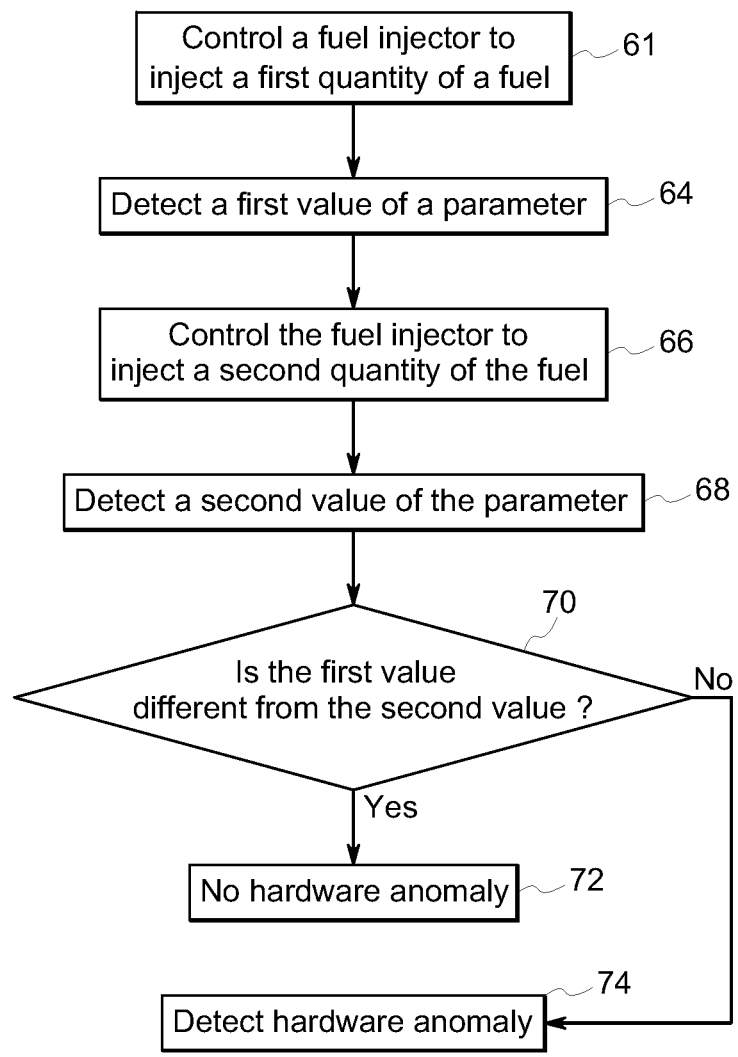
FIG. 3 is a flow chart illustrating exemplary steps involved in hardware anomaly diagnosis in accordance with one exemplary embodiment.

Referring to FIG. 3, a flow chart illustrating exemplary steps involved in hardware anomaly diagnosis is shown in accordance with one exemplary embodiment. The method involves controlling a fuel injector via a control unit to inject a first quantity of a fuel into a cylinder from the plurality of cylinders of an engine 61. Then a first value of a parameter associated with the engine is detected by a parameter sensor 64. Further, the method involves controlling the fuel injector via the control unit to inject a second quantity of the fuel different from the first quantity, into the corresponding cylinder from the plurality of cylinders of the engine 66. It should be noted herein the steps discussed herein are performed for one cylinder at a time and then repeated for all the cylinder in a predefined order. The order may vary depending on the application. Additionally, certain cylinders may be flagged for these diagnostics depending on the signals being measured. Then a second value of the parameter associated with the engine is detected by the parameter sensor 68. The control unit receives the first and second values of the parameter and compares the first value with the second value 70. If the first value is different from the second value, no hardware anomaly is detected 72. If the first value is approximately equal to the second value, a hardware anomaly is detected 74.

In one exemplary embodiment, the parameter may be exhaust gas temperature and the control unit detects whether there is an exhaust gas temperature anomaly. In another embodiment, the parameter may be engine speed and the control unit detects whether there is a fuel injector anomaly. In yet another embodiment, the parameter may be exhaust emissions, and the control unit detects whether there is an exhaust emission sensor anomaly. In yet another embodiment, the parameter may be an injection duration for a remaining number of cylinders and the control unit detects a fuel injector anomaly.

Figure 4:
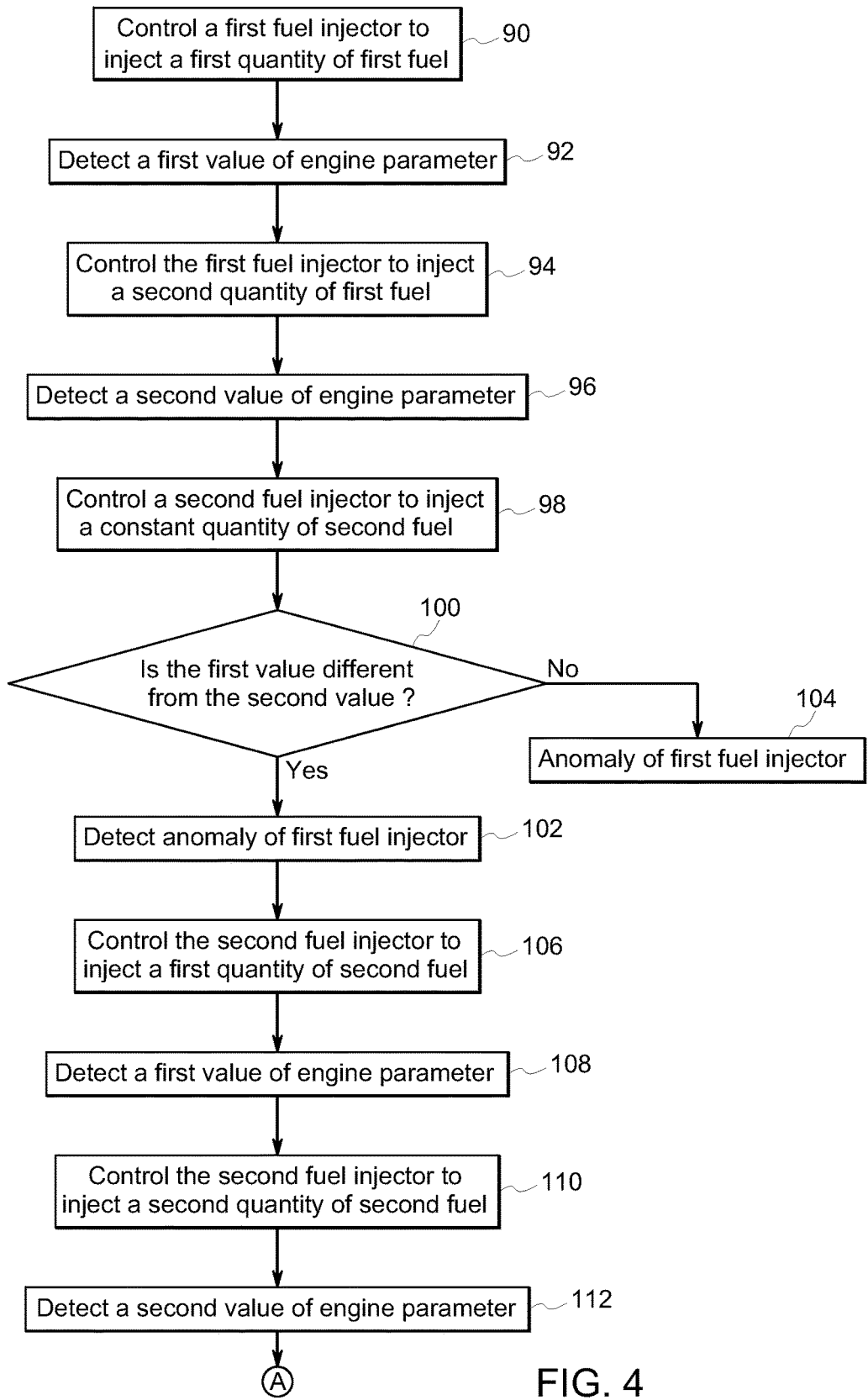
FIG. 4 is a flow chart illustrating exemplary steps involved in hardware anomaly diagnosis for a dual fuel engine in accordance with another exemplary embodiment.

Referring to FIG. 4, a flow chart illustrating exemplary steps involved in hardware anomaly diagnosis for a dual fuel engine is shown in accordance with another exemplary embodiment. The method involves controlling a first fuel injector via a control unit to inject a first quantity of a first fuel into a cylinder among a plurality of cylinders of a dual fuel engine 90. Then a first value of engine parameter is detected by a parameter sensor 92. Further, the method involves controlling the first fuel injector via the control unit to inject a second quantity of the first fuel different from the first quantity, into the corresponding cylinder among the plurality of cylinders of the engine 94. Then a second value of engine parameter is detected by the parameter sensor 96. Further, the method involves controlling a second fuel injector via the control unit to inject a constant quantity of a second fuel, into the corresponding cylinder among the plurality of cylinders of the engine 98. As discussed herein, the steps discussed herein are performed for one cylinder at a time and then repeated for all the cylinder in a predefined order. The order may vary depending on the application. Additionally, certain cylinders may be flagged for these diagnostics depending on the signals being measured. The parameter may be engine speed or exhaust gas temperature or exhaust emissions or injection duration or the like. In one embodiment, the first fuel is a gaseous fuel and the second fuel is a liquid fuel such as diesel.

The control unit receives the first and second values of the engine parameter and compares the first value with the second value 100. If the first value is different from the second value, a normality of the first fuel injector is detected 102. If the first value is approximately equal to the second value, there is detection of anomaly of the first fuel injector 104.

If the normality of the first fuel injector is detected, further, the method involves controlling the second fuel injector via a control unit to inject a first quantity of the second fuel into the corresponding cylinder among the plurality of cylinders of the dual fuel engine 106. Then a first value of engine parameter is detected by the parameter sensor 108. Further, the method involves controlling the second fuel injector via the control unit to inject a second quantity of the second fuel different from the first quantity, into the corresponding cylinder among the plurality of cylinders of the engine 110. Then a second value of engine parameter is detected by the parameter sensor 112.

Figure 5:
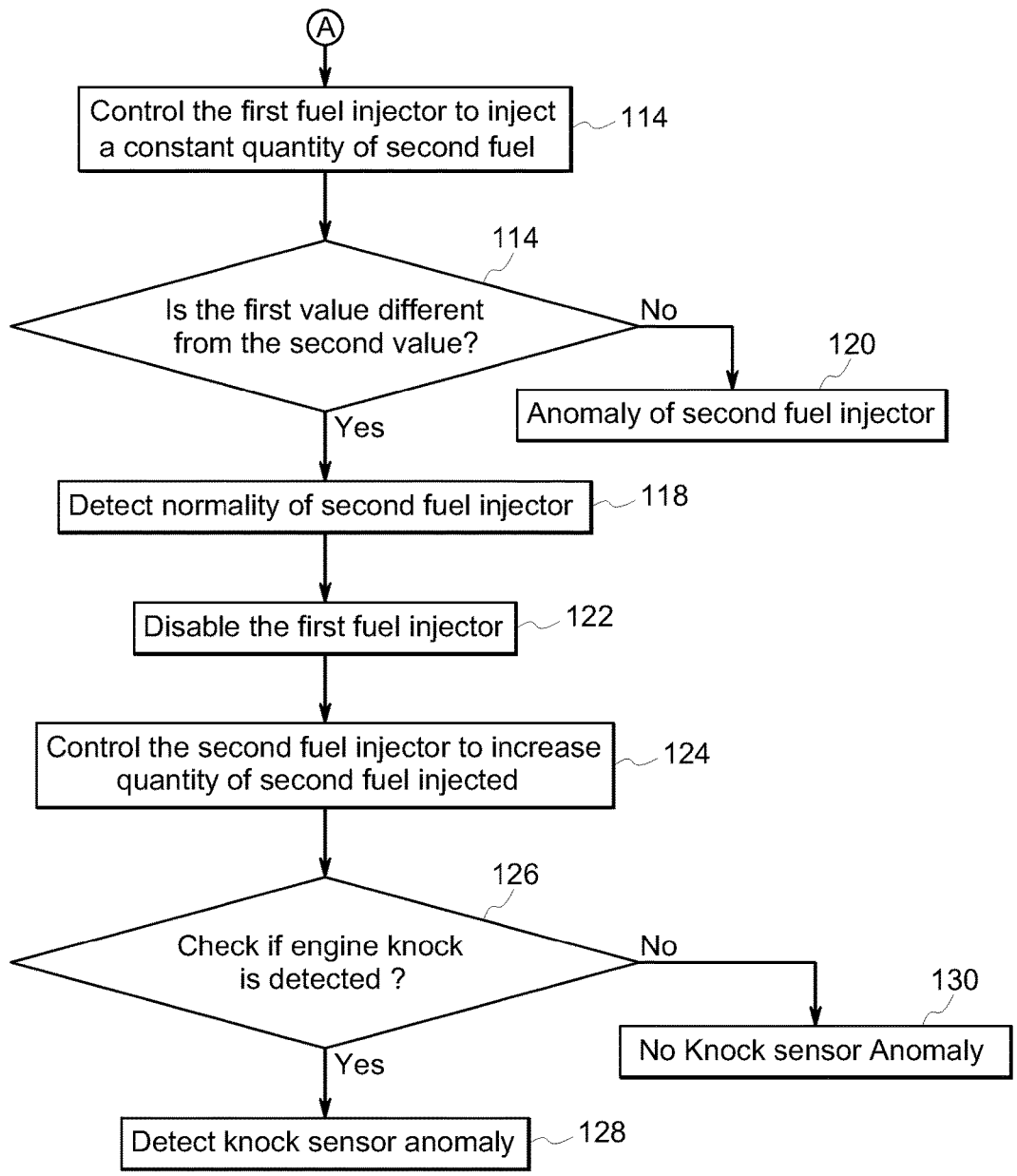
FIG. 5 is a flow chart illustrating exemplary steps involved in hardware anomaly diagnosis in accordance with the embodiment of FIG. 4.

Referring to FIG. 5, a flow chart illustrating exemplary steps involved in hardware anomaly diagnosis is shown in accordance with exemplary embodiment of FIG. 4. The method involves controlling the first fuel injector via the control unit to inject a constant quantity of the first fuel, into a cylinder among the plurality of cylinders of the engine 114.

The control unit receives the first and second values of the engine parameter 108, 112 and compares the first value with the second value 116. If the first value is different from the second value, a normality of the second fuel injector is detected 118. If the first value is approximately equal to the second value, there is detection of anomaly of the second fuel injector 120.

If the normality of the second fuel injector is detected, the method further involves disabling the first fuel injector 122. The method further involves controlling the second fuel injector via the control unit to increase quantity of the liquid fuel injected into the corresponding cylinder among the plurality of cylinders of the engine 124. Further, the control unit checks if the knock sensor detects an engine knock 126. If the knock sensor detects an engine knock, then a knock sensor anomaly is detected 128. If engine knock is not detected, there is no detection of anomaly of knock sensor 130.

Figure 6:
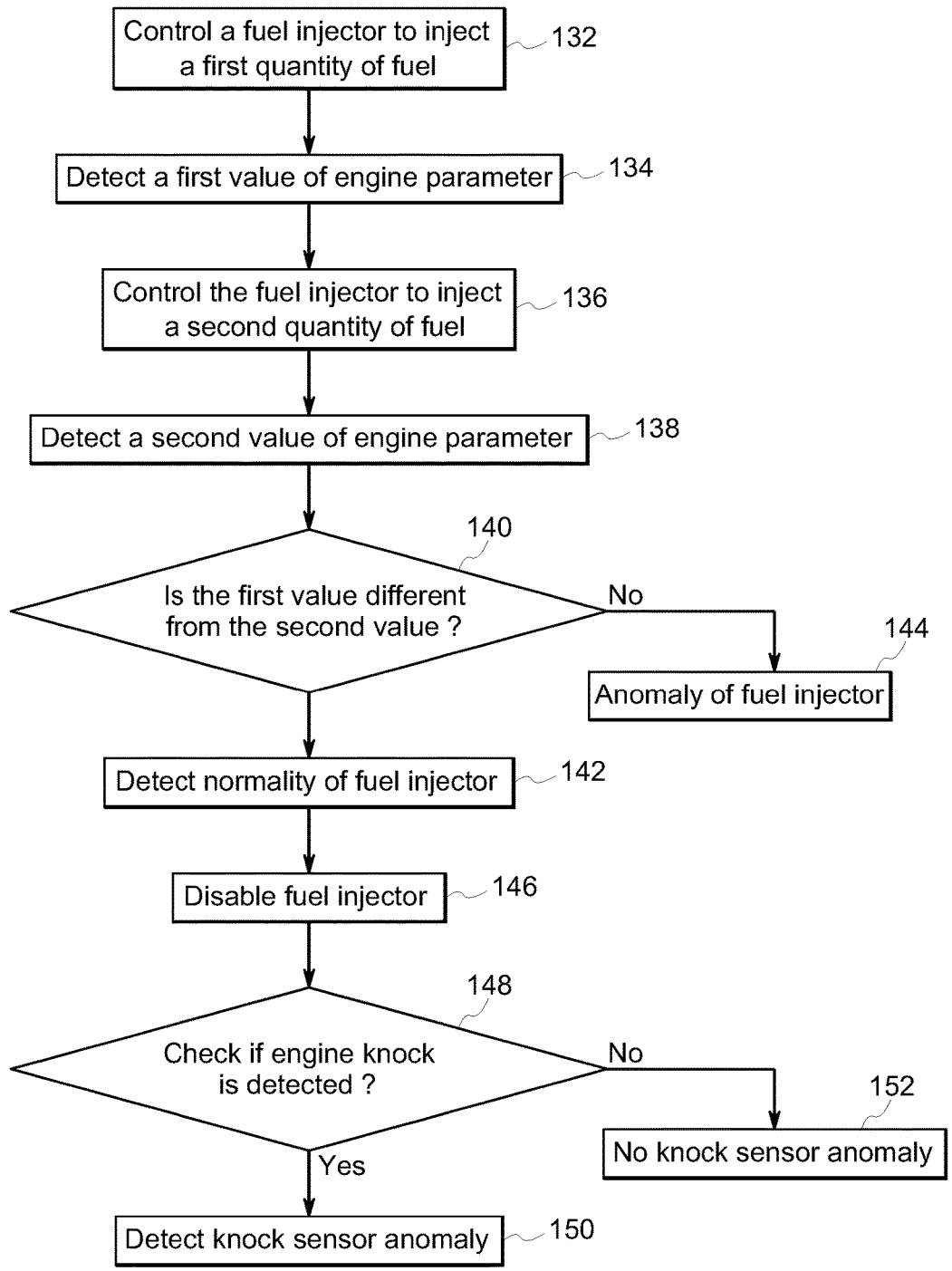
FIG. 6 is a flow chart illustrating exemplary steps involved in hardware anomaly diagnosis for a single fuel engine in accordance with yet another exemplary embodiment.

Referring to FIG. 6, a flow chart illustrating exemplary steps involved in hardware anomaly diagnosis for a single fuel engine is shown in accordance with another exemplary embodiment. The method involves controlling a fuel injector via a control unit to inject a first quantity of a fuel into a cylinder among a plurality of cylinders of the engine 132. Then a first value of engine parameter is detected by a parameter sensor 134. Further, the method involves controlling the fuel injector via the control unit to inject a second quantity of the fuel different from the first quantity, into the corresponding cylinder among the plurality of cylinders of the engine 136. Then a second value of engine parameter is detected by the parameter sensor 138. As discussed herein, the steps discussed herein is performed for one cylinder at a time and then repeated for all the cylinder in a predefined order.

The control unit receives the first and second values of the engine parameter and compares the first value with the second value 140. If the first value is different from the second value, a normality of the fuel injector is detected 142. If the first value is approximately equal to the second value, there is detection of anomaly of the fuel injector 144.

If the normality of the fuel injector is detected, the method further involves disabling the fuel injector 146. Further, the control unit checks if the knock sensor detects an engine knock 148. If the knock sensor detects an engine knock, then a knock sensor anomaly is detected 150. If engine knock is not detected, there is no detection of anomaly of the knock sensor 152.

In accordance with the embodiments discussed herein, the exemplary automatic diagnostic techniques facilitate to pinpoint the root cause of detected knock or misfire, combustion generated knock or misfire, apparent knock or misfire caused by a failed injector, apparent false knock or misfire caused by a sensor failure. An advantage is that a customer can more easily know what component has failed and what needs to be repaired or replaced, thereby saving significant time involved in troubleshooting of failed components. Furthermore, the engine can respond appropriately to protect the engine while simultaneously maintaining operability.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method comprising:
controlling a fuel injector to inject a first quantity of a fuel into a cylinder of a plurality of cylinders, of an engine;
detecting a first value of a parameter associated with the engine;
controlling the fuel injector to inject a second quantity of the fuel different from the first quantity of the fuel, into the cylinder of the engine;
detecting a second value of the parameter associated with the engine;
comparing the detected first value with the detected second value; and
detecting a hardware anomaly associated with the engine based on the comparison of the detected first value with the detected second value, wherein the parameter comprises at least one of an exhaust gas temperature, an amount of exhaust emissions, and an injection duration for a remaining number of cylinders of the plurality of cylinders.

2. The method of claim 1, wherein the parameter comprises the exhaust gas temperature and the hardware anomaly comprises an exhaust gas temperature sensor anomaly.

3. The method of claim 1, wherein the parameter comprises the amount of exhaust emissions and the hardware anomaly comprises an exhaust emission sensor anomaly.

4. The method of claim 1, wherein the parameter comprises the injection duration for a remaining number of cylinders of the plurality of cylinders and the hardware anomaly comprises a fuel injector anomaly.

5. The method of claim 1, wherein the fuel comprises a first fuel, the engine comprises a dual fuel engine, and the fuel injector comprises a first fuel injector.

6. The method of claim 5, further comprising:
controlling the first fuel injector to inject a first quantity of the first fuel into the cylinder of the dual fuel engine; and
detecting the first value of the parameter.

7. The method of claim 6, further comprising:
controlling the first fuel injector to inject a second quantity of the first fuel different from the first quantity of the first fuel, into the cylinder of the dual fuel engine; and
detecting the second value of the parameter.

8. The method of claim 7, further comprising controlling a second fuel injector to inject a constant quantity of a second fuel into the cylinder of the dual fuel engine.

9. The method of claim 8, further comprising detecting a normality of the first fuel injector if the detected first value is different from the detected second value and the hardware anomaly of the first fuel injector if the detected first value is approximately equal to the detected second value.

10. The method of claim 9, further comprising:
controlling the second fuel injector to inject a first quantity of the second fuel into the cylinder of the dual fuel engine; and
detecting the first value of the parameter.

11. The method of claim 10, further comprising:
controlling the second fuel injector to inject a second quantity of the second fuel different from the first quantity of the second fuel, into the cylinder of the dual fuel engine; and
detecting the second value of the parameter.

12. The method of claim 11, further comprising controlling the first fuel injector to inject a constant quantity of the first fuel into the cylinder of the dual fuel engine.

13. The method of claim 12, further comprising detecting a normality of the second fuel injector if the detected first value is different from the detected second value and the hardware anomaly of the second fuel injector if the detected first value is approximately equal to the detected second value.

14. The method of claim 13, further comprising disabling the first fuel injector and controlling the second fuel injector to increase a quantity of the second fuel injected into the cylinder of the dual fuel engine.

15. The method of claim 14, further comprising detecting the hardware anomaly comprising a knock sensor anomaly if a knock sensor detects an engine knock.

16. The method of claim 1, further comprising disabling the fuel injector and detecting the hardware anomaly comprising a knock sensor anomaly if a knock sensor detects an engine knock.

17. A computer readable medium, having instructions stored thereon which, when executed, causes a processor-based unit for an engine to perform a method, the method comprising:
controlling a fuel injector to inject a first quantity of a fuel into a cylinder of a plurality of cylinders, of an engine;
receiving a detected first value of a parameter associated with the engine, from a parameter sensor;
controlling the fuel injector to inject a second quantity of the fuel different from the first quantity of the fuel, into the cylinder of the engine;
receiving a detected second value of the parameter associated with the engine, from the parameter sensor;
comparing the detected first value with the detected second value; and
detecting a hardware anomaly associated with the engine based on the comparison of the detected first value with the detected second value, wherein the parameter comprises at least one of an exhaust gas temperature, an amount of exhaust emissions, and an injection duration for a remaining number of cylinders of the plurality of cylinders.

18. The computer readable medium of claim 17, wherein the fuel comprises a first fuel, the engine comprises a dual fuel engine, and the fuel injector comprises a first fuel injector.

19. The computer readable medium of claim 18, wherein the method further comprises:
controlling the first fuel injector to inject a first quantity of the first fuel into the cylinder of the dual fuel engine; and
detecting the first value of the parameter.

20. The computer readable medium of claim 19, wherein the method further comprises:
controlling the first fuel injector to inject a second quantity of the first fuel different from the first quantity of the first fuel, into the cylinder of the dual fuel engine; and
detecting the second value of the parameter.

21. The computer readable medium of claim 20, wherein the method further comprises controlling a second fuel injector to inject a constant quantity of a second fuel into the cylinder of the dual fuel engine.

22. The computer readable medium of claim 21, wherein the method further comprises detecting a normality of the first fuel injector if the detected first value is different from the detected second value and the hardware anomaly of the first fuel injector if the detected first value is approximately equal to the detected second value.

23. The computer readable medium of claim 22, wherein the method further comprises:
controlling the second fuel injector to inject a first quantity of the second fuel into the cylinder of the dual fuel engine; and
detecting the first value of the parameter.

24. The computer readable medium of claim 23, wherein the method further comprises:
controlling the second fuel injector to inject a second quantity of the second fuel different from the first quantity of the second fuel, into the cylinder of the dual fuel engine; and
detecting the second value of the parameter.

25. The computer readable medium of claim 24, wherein the method further comprises controlling the first fuel injector to inject a constant quantity of the first fuel into the cylinder of the dual fuel engine.

26. The computer readable medium of claim 25, wherein method further comprises detecting a normality of the second fuel injector if the detected first value is different from the detected second value and the hardware anomaly of the second fuel injector if the detected first value is approximately equal to the detected second value.

27. The computer readable medium of claim 26, wherein the method further comprises disabling the first fuel injector and controlling the second fuel injector to increase a quantity of the second fuel injected into the cylinder of the dual fuel engine.

28. The computer readable medium of claim 27, wherein the method further comprises detecting the hardware anomaly comprising a knock sensor anomaly if a knock sensor detects an engine knock.

29. The computer readable medium of claim 17, wherein the method further comprises disabling the fuel injector and detecting the hardware anomaly comprising a knock sensor anomaly if a knock sensor detects an engine knock.

30. A system comprising:
an engine comprising a plurality of cylinders and a plurality of fuel injectors coupled to the corresponding plurality of cylinders;
a controller coupled to the plurality of fuel injectors;
wherein the controller is configured to:
control a fuel injector of the plurality of fuel injectors to inject a first quantity of a fuel into a cylinder of the plurality of cylinders, of the engine;
receive a detected first value of a parameter associated with the engine, from a parameter sensor;
control the fuel injector of the plurality of fuel injectors to inject a second quantity of the fuel different from the first quantity of the fuel, into the cylinder of the engine;
receive a detected second value of the parameter associated with the engine, from the parameter sensor;
compare the detected first value with the detected second value; and
detect a hardware anomaly associated with the engine based on the comparison of the detected first value with the detected second value, wherein the parameter comprises at least one of an exhaust gas temperature, an amount of exhaust emissions, and an injection duration for a remaining number of cylinders of the plurality of cylinders.

* * * * *